(12) United States Patent
Demoulin et al.

(10) Patent No.: US 9,948,909 B2
(45) Date of Patent: Apr. 17, 2018

(54) APPARATUS AND A METHOD FOR MODIFYING COLORS OF A FOCAL STACK OF A SCENE ACCORDING TO A COLOR PALETTE

(71) Applicant: THOMSON LICENSING, Issy les Moulineaux (FR)

(72) Inventors: Vincent Demoulin, Montfort sur Meu (FR); Neus Sabater, Betton (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 0 days.

(21) Appl. No.: 15/199,760

(22) Filed: Jun. 30, 2016

(65) Prior Publication Data

US 2017/0006270 A1    Jan. 5, 2017

(30) Foreign Application Priority Data

Jun. 30, 2015    (EP) .................................... 15306056

(51) Int. Cl.
| | |
|---|---|
| *G02B 13/16* | (2006.01) |
| *H04N 5/225* | (2006.01) |
| *H04N 9/64* | (2006.01) |
| *H04N 1/56* | (2006.01) |
| *H04N 1/60* | (2006.01) |

(52) U.S. Cl.
CPC ............... *H04N 9/646* (2013.01); *H04N 1/56* (2013.01); *H04N 1/60* (2013.01)

(58) Field of Classification Search
CPC ............. H04N 9/646; H04N 1/56; H04N 1/60
USPC ................. 348/335, 340, 345, 348, 350, 352
See application file for complete search history.

(56) References Cited

U.S. PATENT DOCUMENTS

| | | |
|---|---|---|
| 8,749,620 B1 | 6/2014 | Knight et al. |
| 8,824,793 B2 | 9/2014 | Intwala et al. |
| 2013/0215108 A1 | 8/2013 | McMahon et al. |
| | (Continued) | |

FOREIGN PATENT DOCUMENTS

WO    WO2013126578    8/2013

OTHER PUBLICATIONS

Jarabo et al., "How Do People Edit Light Fields?", ACM Transactions on Graphics, vol. 33, No. 4, Article 146, Jul. 2014, pp. 1-10.

(Continued)

*Primary Examiner* — Yogesh Aggarwal
(74) *Attorney, Agent, or Firm* — Tutunjian & Bitetto, P.C.

(57) ABSTRACT

The present invention generally relates to COLOR transfer between two images. COLOR transfer is a known technic consisting in modifying the COLORs of a source image by applying the COLOR palette of an example image without changing the source image structure. A lot of COLOR transfer method are known which consist in transferring COLORs between two images, however, those methods do not preserve the quality of the bokeh in areas of an images that are not in focus at a given depth. This results in a navigation in the depth dimension that is not smooth. It is proposed to modify the COLORs of a focal stack of a scene according to a COLOR palette by propagating the COLORs of the pixels in focus in different layers of the reCOLORed focal stack to the layers of the reCOLORed focal stack located behind the layer wherein a considered pixel is in focus.

13 Claims, 4 Drawing Sheets

(56) References Cited

U.S. PATENT DOCUMENTS

2014/0085422 A1* 3/2014 Aronsson ................. G06T 5/50
 348/46
2014/0204111 A1 7/2014 Vaidyanathan et al.
2015/0110391 A1* 4/2015 Zhou .................... G06T 7/0081
 382/164

OTHER PUBLICATIONS

Seitz et al., "Plenoptic Image Editing", International Journal of Computer Vision, vol. 48, No. 2, Jul. 2002, pp. 115-129.

Kodama et al., "Efficient Reconstruction of All-in-Focus Images Through Shifted Pinholes from Multi-Focus Images for Dense Light Field Synthesis and Rendering", IEEE Transactions on Image Processing, vol. 22, No. 11, Nov. 2013, pp. 4407-4421.

Reinhard et al., "Color Transfer between Images", IEEE Computer Graphics and Applications, vol. 21, No. 5, Sep./Oct. 2001, pp. 34-41.

Pitié et al., "Automated colour grading using colour distribution transfer", Computer Vision and Image Understanding, vol. 107, No. 1-2, Jul. 2007, pp. 123-137.

Frigo et al., "Optimal Transportation for Example-Guided Color Transfer", 12th Asian Conference on Computer Vision, Singapore, Singapore, Nov. 1, 2014, pp. 1-16.

Perez Nava et al., "Simultaneous Estimation of Super-Resolved Depth and All-in-Focus Images From a Plenoptic Camera", IEEE 3DTV Conference: The True Vision-Capture, Transmission and Display of 3D Video, Potsdam, Germany, May 4, 2009, pp. 1-4.

\* cited by examiner

US 9,948,909 B2

APPARATUS AND A METHOD FOR MODIFYING COLORS OF A FOCAL STACK OF A SCENE ACCORDING TO A COLOR PALETTE

This application claims the benefit, under 35 U.S.C. § 119 of European Patent Application No. 15306056.1, filed Jun. 30, 2015.

TECHNICAL FIELD

The present disclosure relates to an apparatus and a method for modifying colors of a focal stack of a scene according to a color palette.

BACKGROUND

Color transfer is a known technic consisting in modifying the COLORs of a source image by applying the COLOR palette of an example image without changing the source image structure.

A lot of color transfer method are known which consist in transferring colors between two images. One of these methods is disclosed in Frigo et al. "Optimal Transportation for Example-Guided COLOR Transfer", *Asian Conference on Computer Vision*, 2014.

Such a method consists in processing separately the processing of the luminance and the chroma channels of an image. The luminance channel is addressed using a chromatic adaption transform, accounting for the illuminant change, while the chroma channels are transformed using an optimal transportation.

The chromatic adaptation transform consists in modifying the illuminant of the input image with respect to the example image illuminant. In order to do so, the color of the illuminant of the example image is estimated. The illuminant of the input image is then modified so as to adapt to the estimated illuminant of the example image.

In order to define the COLOR chroma transfer, set of modes from the input image and example image are extracted. Then, a COLOR transfer based on an optimal mapping between these two sets of modes is performed.

Such a method does not preserve the quality of the bokeh in areas of an images that are not in focus at a given depth. This results in a navigation in the depth dimension that is not smooth.

The present invention has been devised with the foregoing in mind.

SUMMARY OF INVENTION

A first aspect of the invention concerns an apparatus for modifying COLORs of a focal stack of a scene according to a COLOR palette comprising a processor configured to:
  applying the COLOR palette to an all-in-focus image generated from said focal stack,
  estimating the COLOR of a not-in-focus pixel in a layer of a reCOLORed focal stack generated from the obtained reCOLORed all-in-focus image of the scene depending on a COLOR and on a position in said reCOLORed focal stack of at least one pixel in focus in at least one layer of said reCOLORed focal stack.

According to an embodiment of the apparatus, the processor is configured to apply the COLOR palette of an image of another scene.

According to an embodiment of the apparatus, the image of the other scene is an all-in-focus image generated from a focal stack of the other scene.

According to an embodiment of the apparatus, the processor is configured to store, during the generation of the all-in-focus image, a position in the focal stack of a layer wherein a pixel is in focus.

According to an embodiment of the apparatus, the processor is configured to generate the reCOLORed focal stack by putting a pixel of the reCOLORed all-in-focus image back into the layer of the reCOLORed focal stack wherein said pixel is focus.

According to an embodiment of the apparatus, the processor is configured to propagate the COLOR of a pixel in focus in a layer of the reCOLORed focal stack to the other layers of the reCOLORed focal stack by computing a convolution of said pixel in focus with a kernel.

According to an embodiment of the apparatus, a size of the kernel is proportional to the position of a layer in the reCOLORed focal stack.

According to an embodiment of the apparatus, when a pixel is in focus in a layer of the reCOLORed focal stack, the processor is configured to associate the COLOR of said pixel in the reCOLORed all-in-focus to said pixel in focus in said layer of the reCOLORed focal stack.

According to an embodiment of the apparatus, the processor is configured to estimate the COLOR of a pixel in a layer of said reCOLORed focal stack wherein said pixel is not in focus by computing a weighted average of the COLORs associated to said pixel in other layers located before said layer in the reCOLORed focal stack.

According to an embodiment of the apparatus, the weights used in the computation of the weighted average are inversely proportional to a distance in the reCOLORed focal stack between the layer in which the COLOR to be associated to the pixel is computed and the layer wherein said pixel is in focus.

Another aspect of the invention concerns a method for modifying COLORs of a focal stack of a scene according to a COLOR palette comprising:
  applying the COLOR palette to an all-in-focus image generated from said focal stack,
  estimating the COLOR of a not-in-focus pixel in a layer of a reCOLORed focal stack generated from the obtained reCOLORed all-in-focus image of the scene depending on a COLOR and on a position in said reCOLORed focal stack of at least one pixel in focus in at least one layer of said reCOLORed focal stack.

According to an embodiment of the method, the applied COLOR palette is the COLOR palette of an image of another scene.

According to an embodiment of the method, the image of the other scene is an all-in-focus image generated from a focal stack of the other scene.

According to an embodiment of the method, the method further comprises storing, during the generation of the all-in-focus image, a position in the focal stack of a layer wherein a pixel is in focus.

According to an embodiment of the method, the method further comprises generating the reCOLORed focal stack by putting a pixel of the reCOLORed all-in-focus image back into the layer of the reCOLORed focal stack wherein said pixel is focus.

According to an embodiment of the method, the method further comprises propagating the COLOR of a pixel in focus in a layer of the reCOLORed focal stack to the other layers of the reCOLORed focal stack by computing a convolution of said pixel in focus with a kernel.

According to an embodiment of the method, a size of the kernel is proportional to the position of a layer in the reCOLORed focal stack.

According to an embodiment of the method, when a pixel is in focus in a layer of the reCOLORed focal stack, the method further comprises associating the COLOR of said pixel in the reCOLORed all-in-focus to said pixel in focus in said layer of the reCOLORed focal stack.

According to an embodiment of the method, the method further comprises estimating the COLOR of a pixel in a layer of said reCOLORed focal stack wherein said pixel is not in focus by computing a weighted average of the COLORs associated to said pixel in other layers located before said layer in the reCOLORed focal stack.

According to an embodiment of the method, the weights used in the computation of the weighted average are inversely proportional to a distance in the reCOLORed focal stack between the layer in which the COLOR to be associated to the pixel is computed and the layer wherein said pixel is in focus.

Some processes implemented by elements of the invention may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, such elements may take the form of a computer program product embodied in any tangible medium of expression having computer usable program code embodied in the medium.

Since elements of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

As will be appreciated by one skilled in the art, aspects of the present principles can be embodied as a system, method or computer readable medium. Accordingly, aspects of the present principles can take the form of an entirely hardware embodiment, an entirely software embodiment, (including firmware, resident software, micro-code, and so forth) or an embodiment combining software and hardware aspects that can all generally be referred to herein as a "circuit", "module", or "system". Furthermore, aspects of the present principles can take the form of a computer readable storage medium. Any combination of one or more computer readable storage medium (a) may be utilized.

A plenoptic camera is able to measure the amount of light traveling along each bundle of rays that intersects a sensor, by arranging a microlens array between a main lens and the sensor. The data acquired by such a camera are called light-field data. These light-field data can be post-processed to reconstruct images of a scene from different viewpoints. The light-field data can be used to generate a focal stack which comprises a collection of images each having different re-focusing depth. As a result, a user can change a focal point of the images. Compared to a conventional camera, the plenoptic camera can obtain additional optical information components for achieving the reconstruction of the images of a scene from the different viewpoints and re-focusing depth by post-processing.

Figure 1A:
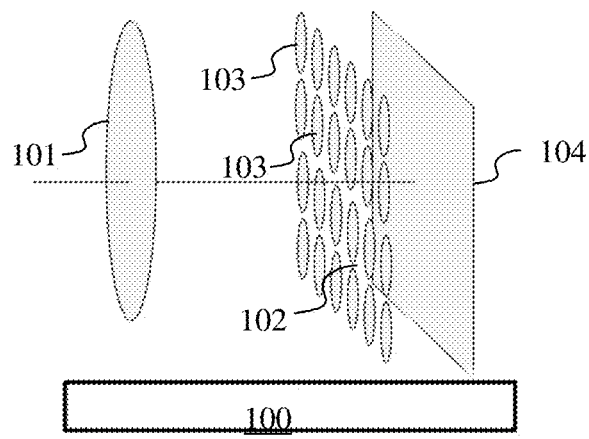
FIG. 1A schematically represents a plenoptic camera.

FIG. 1A is a diagram schematically representing a plenoptic camera 100. Light-field cameras are capable of recording four-dimensional (or 4D) light-field data. The plenoptic camera 100 comprises a main lens 101, a microlens array 102 and an image sensor 104.

Figure 1B:
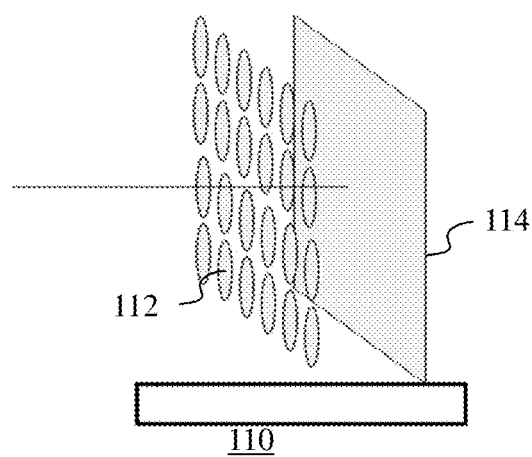
FIG. 1B represents a multi-array camera.

FIG. 1B represents a multi-array camera 110. The multi-array camera 110 comprises a lens array 112 and an image sensor 114.

In the example of the plenoptic camera 100 as shown in FIG. 1A, the main lens 101 receives light from an object (not shown on the figure) in an object field of the main lens 101 and passes the light through an image field of the main lens 101. The microlens array 102 includes a plurality of microlenses 103 arranged in a two-dimensional array.

Data captured by a light-field camera can be post-processed to reconstruct images of a scene from different points of view. Since a light-field camera is capable of capturing a collection of partial views of a same scene from slightly changed point of views, it is possible to create an image with a customized focus plane by combining those different partial views.

Figure 2:
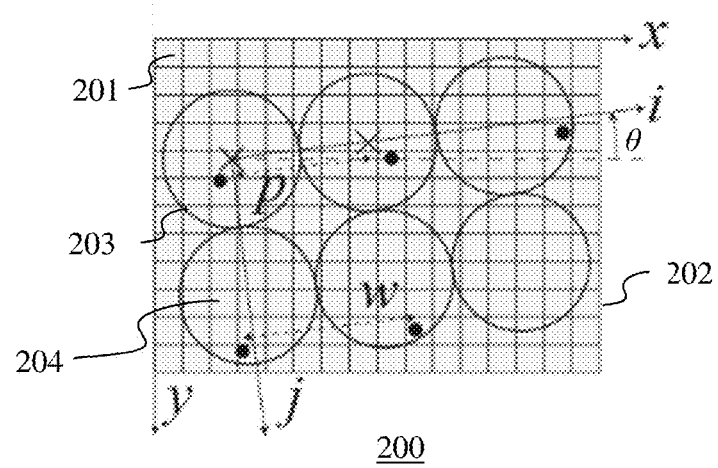
FIG. 2 schematically illustrates a plan view of sensor regions arranged on the sensing surface of an image sensor of a light-field camera.

FIG. 2 is a plan view schematically illustrating an example of sensor regions arranged on the sensing surface of an image sensor of a light-field camera. As illustrated in FIG. 2, the image sensor 200 includes a plurality of pixels 201 arranged in a two-dimensional array, and receives the light from the object through the microlens array 202. Each of the microlenses 203 of the microlens array 202 has the lens properties to direct the light to a circular area 204 on the image sensor 200. An outer contour of the circular area 204 may represent the shape of a microlens image formed and captured on the image sensor 200, which shape depends on the shape of the microlens 203. Amongst all of the pixels 201 on the image sensor 200, only the pixels 201 located substantially inside the circular area 204 contribute to the imaging. In other words, a pixel area (or sensing area) of each pixel 201 that contributes to the imaging is located substantially inside the circular area 204.

The image sensor 200 of a light-field camera records an image comprising a collection of two-dimensional (or 2D) microlens images arranged within a 2D image. Each microlens 203 of the microlens array 202 forms a microlens image represented by a circular area 204. Coordinates of pixels 201 on the sensor 200 are indicated by an ordered pair (x, y) in a x-y coordinate system on the surface of the image sensor 200 as shown in FIG. 2. A distance p is the distance between two consecutive microlens images. Microlenses 203 are chosen such that the distance p is larger than the size of a pixel 201. A distance w is the disparity distance between two consecutive microlens images. Microlens images are referred by their respective coordinates (i,j) in a i-j coordinate system on the surface of the image sensor 200 as shown in FIG. 2.

As mentioned above, only the pixels 201 located substantially inside the circular area 204 receive the light through a microlens 203. The inter microlens space may be masked out to prevent photons to pass outside a microlens 203. If the microlenses 203 have a square shape and the inter microlens space is not formed, such a masking is not needed.

The center of a microlens image (i,j) is located on the image sensor 200 at the coordinate $(x_{i,j}, y_{i,j})$ in the x-y coordinate system. A $\theta$ represents an angle between the square lattice of pixels 201 and the square lattice of microlenses 204. The coordinates $(x_{i,j}, y_{i,j})$ of the center of the microlens image can be deduced by the following equation (1) considering $(x_{0,0}, y_{0,0})$ as the pixel coordinate of the microlens image (0,0):

$$\begin{bmatrix} x_{i,j} \\ y_{i,j} \end{bmatrix} = p \begin{bmatrix} \cos\theta & -\sin\theta \\ \sin\theta & \cos\theta \end{bmatrix} \begin{bmatrix} i \\ j \end{bmatrix} + \begin{bmatrix} x_{0,0} \\ y_{0,0} \end{bmatrix} \quad (1)$$

The distances p and w are given in unit of pixel. They are converted into physical unit of distance, for example meters, P and W, respectively, by multiplying the pixel size $\delta$ in meters: $W = \delta w$ and $P = \delta p$. These distances depend on the characteristics of the light-field camera.

Figure 3:
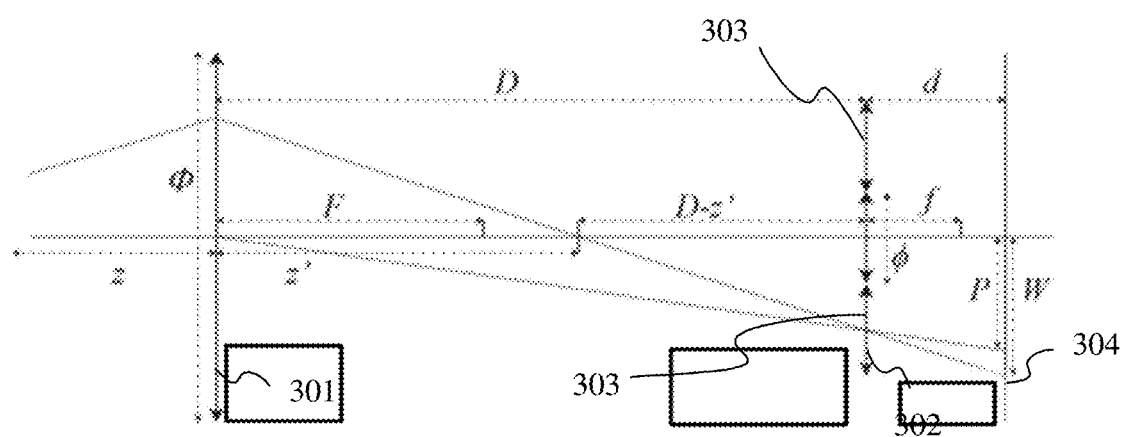
FIG. 3 illustrates a schematic light-field camera comprising an ideal, perfect thin lens model.

Here, exemplary optical properties of a light-field camera will be discussed with reference to FIG. 3 which illustrates a schematic light-field camera comprising an ideal, perfect thin lens model.

The main lens 301 has a focal length F and an aperture $\Phi$. The microlens array 302 comprises microlenses 303 having a focal length $f$. The pitch of the microlens array 302 is $\phi$. The microlens array 302 is located at a distance D from the main lens 301 and at a distance d from the sensor 304. An object (not shown on the figure) is located at a distance z from the main lens 301. This object is focused by the main lens 301 at a distance z' from the main lens 301. FIG. 3 illustrates the case where D>z'. In this case, microlens images can be in-focus on the sensor 304 depending on d and $f$.

A major property of a light-field camera is the possibility to compute 2D re-focused images where the re-focalization distance is freely adjustable after the shot of the images.

A 4D light-field image L of size $[N_x, N_y]$, where $N_x$ and $N_y$ represent the number of pixels along the x-axis and the y-axis respectively, is projected into a 2D image by shifting and zooming microlens images and then summing them into a 2D image. The amount of shift of the microlens images controls the re-focalization distance. The projection of a pixel of coordinates (x,y,i,j) in the 4D light-field image L into the re-focused 2D image coordinate (X, Y) is defined by:

$$\begin{bmatrix} X \\ Y \end{bmatrix} = sg\left(\begin{bmatrix} x \\ y \end{bmatrix} - \begin{bmatrix} x_{i,j} \\ y_{i,j} \end{bmatrix}\right) + s\begin{bmatrix} x_{i,j} \\ y_{i,j} \end{bmatrix} \quad (2)$$

where s controls the size of the 2D re-focused image, and g controls the focalization distance of the re-focused image. This equation (6) can be rewritten as equation (7) by considering equation (1):

$$\begin{bmatrix} X \\ Y \end{bmatrix} = sg\begin{bmatrix} x \\ y \end{bmatrix} + sp(1-g)\begin{bmatrix} \cos\theta & -\sin\theta \\ \sin\theta & \cos\theta \end{bmatrix}\begin{bmatrix} i \\ j \end{bmatrix} + s(1-g)\begin{bmatrix} x_{0,0} \\ y_{0,0} \end{bmatrix} \quad (3)$$

The parameter g can be expressed as function of p and w as in equation (4). The parameter g represents the zoom that must be performed on the microlens images, using their centers as reference, such that the various zoomed views of the same objects get superposed.

$$g = \frac{p}{p-w} \quad (4)$$

Equation (3) becomes:

$$\begin{bmatrix} X \\ Y \end{bmatrix} = sg\begin{bmatrix} x \\ y \end{bmatrix} - sgw\begin{bmatrix} \cos\theta & -\sin\theta \\ \sin\theta & \cos\theta \end{bmatrix}\begin{bmatrix} i \\ j \end{bmatrix} + \frac{sgw}{p}\begin{bmatrix} x_{0,0} \\ y_{0,0} \end{bmatrix} \quad (5)$$

Figure 4:
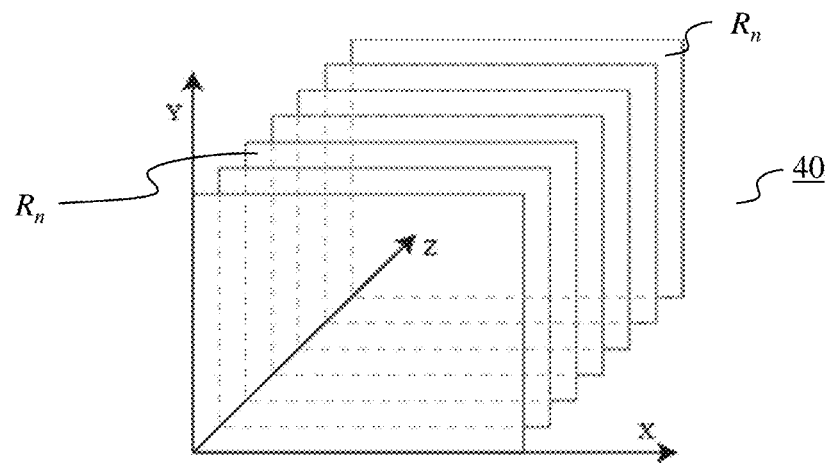
FIG. 4 represents a focal stack computed from acquired 4D light-field data.

In reference to FIG. 4, a focal stack 40 is a collection of N re-focused images, or layers, $R_\eta$ (with $\eta \in [1, N]$) which define a cube of images, where N is a user selected number of images. The N re-focused images are computed for g varying linearly between $g_{min}$ and $g_{max}$ corresponding to a range of focalization distances between $z_{min}$ and $z_{max}$ defined by equation (4). Another option is to compute the focal stack with w varying linearly from $w_{min}$ and $w_{max}$ corresponding to a range of focalization distances between $z_{min}$ and $z_{max}$ defined by equation (4). The min max boundaries of g or w are defined by the user in order to encompass re-focused images with a focalization distance within $z_{min}$ and $z_{max}$.

The computation of the focal stack 40 described in this embodiment is on the assumption that the 4D light-field data are recorded by a single image sensor with a lens array and optionally a main lens. However, the computation of a focal stack 40 is not limited to 4D light-field data recorded by such type of light-field camera, therefore it should be noted that it is possible to compute a focal stack of re-focused images by capturing with a classical camera several images of a same scene with different focus settings.

Figure 5:
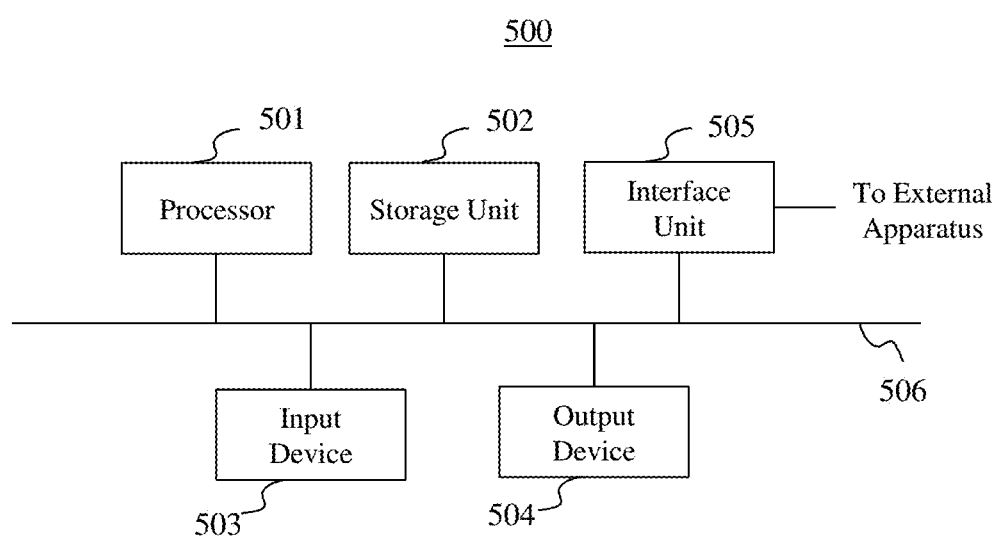
FIG. 5 is a schematic block diagram illustrating an example of an apparatus for modifying COLORs of a focal stack of a scene according to a COLOR palette according to an embodiment of the present disclosure.

FIG. 5 is a schematic block diagram illustrating an example of an apparatus for modifying COLORs of a focal stack of a scene according to a COLOR palette according to an embodiment of the present disclosure.

The apparatus 500 comprises a processor 501, a storage unit 502, an input device 503, a display device 504, and an interface unit 505 which are connected by a bus 506. Of course, constituent elements of the computer apparatus 500 may be connected by a connection other than a bus connection.

The processor 501 controls operations of the apparatus 500. The storage unit 502 stores at least one program to be executed by the processor 501, and various data, including data such as focal stacks of different scenes, images or COLOR palettes, parameters used by computations performed by the processor 501, intermediate data of computations performed by the processor 501, and so on. The processor 501 may be formed by any known and suitable hardware, or software, or a combination of hardware and software. For example, the processor 501 may be formed by dedicated hardware such as a processing circuit, or by a programmable processing unit such as a CPU (Central Processing Unit) that executes a program stored in a memory thereof.

The storage unit 502 may be formed by any suitable storage or means capable of storing the program, data, or the like in a computer-readable manner. Examples of the storage unit 502 include non-transitory computer-readable storage media such as semiconductor memory devices, and magnetic, optical, or magneto-optical recording media loaded into a read and write unit. The program causes the processor 501 to perform a process for modifying COLORs of a focal stack of a scene according to a COLOR palette according to an embodiment of the present invention as described hereinafter with reference to FIG. 6.

The input device 503 may be formed by a keyboard, a pointing device such as a mouse, or the like for use by the user to input commands, to make user's selections of three-dimensional (or 3D) models of an object of interest use to define a re-focusing surface. The output device 504 may be formed by a display device to display, for example, a Graphical User Interface (GUI), images generated according to an embodiment of the present disclosure. The input device 503 and the output device 504 may be formed integrally by a touchscreen panel, for example.

The interface unit 505 provides an interface between the apparatus 500 and an external apparatus. The interface unit 505 may be communicable with the external apparatus via cable or wireless communication. In an embodiment, the external apparatus may be a light-field camera. In this case, data of 4D light-field images captured by the light-field camera can be input from the light-field camera to the apparatus 500 through the interface unit 505, then stored in the storage unit 502.

In this embodiment the apparatus 500 is exemplary discussed as it is separated from the light-field camera and they are communicable each other via cable or wireless communication, however it should be noted that the apparatus 500 can be integrated with such a light-field camera. In this later case, the apparatus 500 may be for example a portable device such as a tablet or a smartphone embedding a light-field camera.

Figure 6:
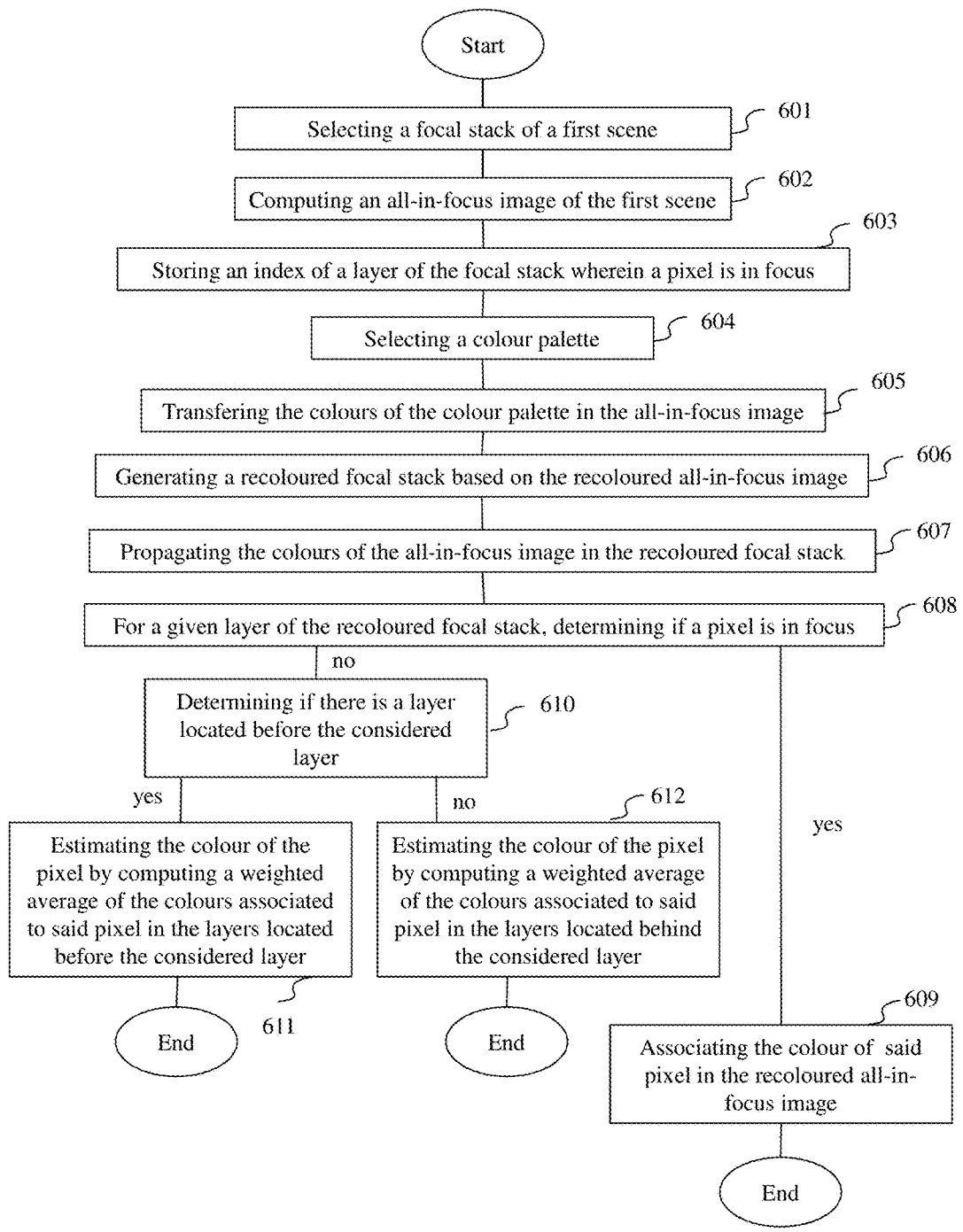
FIG. 6 is a flow chart for explaining a process for modifying COLORs of a focal stack of a scene according to a COLOR palette according to an embodiment of the present invention.

FIG. 6 is a flow chart for explaining a process for modifying COLORs of a focal stack of a scene according to a COLOR palette according to an embodiment of the present invention.

During a step 601, the processor 501 executes a GUI function on the display 504 of the apparatus 500. This GUI function allows a user of the apparatus 500 to select a focal stack of a first scene from a plurality of focal stacks stored in the storage unit 502 of the apparatus 500.

Once the focal stack of the first scene is selected, the processor 501 computes an all-in-focus image of the first scene based on the selected focal stack during a step 602. An all-in-focus image is an image in which all the points constituting the image are in focus. The processor 601 computes the all-in-focus image of the first scene by selecting in each layers of the focal stack of the first scene the pixels which are in focus this layer and placing them in a same image which is the all-in-focus image of the first scene.

In a step 603, the processor 501 stores, in the storage unit 502 of the apparatus 500, for each pixel constituting the all-in-focus image of the first scene an index of the layer of the focal stack of the first scene in which said pixel is in focus. An index of a layer of the focal stack represents the position of a layer in a focal stack. For example, a layer with an index equal to 1 is for example the foreground layer of the focal stack and a layer with an index equal to N is the background layer of the focal stack.

In a step 604, the processor 501 executes a GUI function on the display 504 of the apparatus 500. This GUI function allows a user of the apparatus 500 to select a COLOR palette a plurality of COLOR palettes stored in the storage unit 502 of the apparatus 500.

A COLOR palette is a given, finite set of colors for the management of digital images. In an embodiment of the invention, the selected COLOR palette is the COLOR palette of an image of a second scene stored in the storage unit 502 of the apparatus 500.

In another embodiment of the invention the image of the second scene is an all-in-focus image computed based on a focal stack of the second scene. The all-in-focus image of the second scene may be directly stored in the storage unit 502 of the apparatus 500 or may be computed by the processor 501.

In a step 605, the processor 501 applies the selected COLOR palette to the all-in-focus image of the first scene, this is called COLOR transfer. COLOR transfer consists in modifying the COLORs of an original image such that it acquires the COLOR palette of another image. A COLOR transfer technique that may be executed by the processor 501 is disclosed in Frigo et al. "Optimal Transportation for Example-Guided COLOR Transfer", *Asian Conference on Computer Vision,* 2014. The result of the transferring of the COLOR palette to the all-in-focus image if the first scene is a reCOLORed all-in-focus image of the first scene.

During a step 606, the processor 501 generates a reCOLORed focal stack of the first scene based on the reCOLORed all-in-focus image of the first scene. The reCOLORed focal stack of the first scene is obtained by replacing each pixel of the reCOLORed all-in-focus image in the layer of the reCOLORed focal stack in which said pixel is in focus. This is made possible because the index of the layer of the reCOLORed focal stack of the first scene in which a pixel is in focus is stored in the storage unit 502 of the apparatus 500 for each pixel constituting the reCOLORed all-in-focus image of the first scene.

In a step 607, the processor 501 propagates the COLOR of the pixels in focus to the different layers of the reCOLORed focal stack. In order to propagate the COLOR of a pixel in focus to the other layers of the reCOLORed focal stack, the processor 501 computes a convolution of a pixel in focus with a kernel. In image processing, a kernel, or convolution matrix, is a small matrix used for blurring, or sharpening, etc. an image by computing the convolution between the kernel and an image.

This computation is done for each layer of the reCOLORed focal stack other than the layer wherein the pixel considered for the computation is in focus. In an embodiment of the invention, the kernel is a Gaussian kernel. In another embodiment of the invention, the kernel is a crenel kernel. The type of the kernel, i.e. Gaussian or crenel, gives the geometry of the bokeh of the reCOLORed focal stack.

In order to preserve the quality of the bokeh in the reCOLORed focal stack and to allow a smooth navigation between the different layers of the reCOLORed focal stack, the size of the kernel is proportional to the absolute value of the difference between the index of the layer wherein the pixel considered for the computation is in focus and the index of the layer in the reCOLORed focal stack. That is to say, the greater the absolute value of the index difference the greater the size of the kernel used in the convulsion. Thus, the farther a layer of the reCOLORed focal stack is from the layer wherein the pixel considered for the computation is in focus, the greater the number of pixels of said layer the COLOR of the pixel in focus is associated to.

In an embodiment of the invention, the characteristic of a point spread function of the optical system with which the focal stack was captured are determined by the processor 501 from the focal stack and used for propagating the COLORs in the reCOLORed focal stack. This enables the reproduction of the optical effects found in the focal stack in the reCOLORed focal stack.

As a consequence of the propagation of the COLORs of the different pixels in focus in the reCOLORed focal stack, several COLORs are available for a given pixel in a given layer of the reCOLORed focal stack. In order to estimate the COLOR of a given pixel in a given layer of the reCOLORed focal stack, the processor 501 determines if the considered pixel is in focus in said layer of the reCOLORed focal stack during a step 608.

If the considered pixel is in focus in said layer, then the processor 501 associate to said pixel the COLOR of the considered pixel in the reCOLORed all-in-focus image in a step 609.

If the considered pixel is not in focus in said layer, then the processor 501 determines if there is at least one layer in the reCOLORed focal stack having an index smaller than the index of the considered layer in a step 610. That is to say, the processor 501 determines if there is at least one layer in the reCOLORed focal stack located before the considered layer, for example the layer of the reCOLORed focal stack which index is 3 is located before the layer of the reCOLORed focal stack which index is 4. In the same way, the layer of the reCOLORed focal stack which index is 5 is located behind the layer of the reCOLORed focal stack which index is 4. The smaller the index of the layer in the focal stack the smaller the depth of field of the layer of the focal stack.

In a step 611, the processor 501 estimates the COLOR of the considered pixel by computing a weighted average of the COLORs associated to said pixel in all the layers of the reCOLORed focal stack which have a smaller index than the layer of the reCOLORed focal stack to which the considered pixel belongs.

If the considered pixel is not in focus in said layer and there is no layer in the reCOLORed focal stack having an index smaller than the index of layer to which the considered pixel belongs, then the processor 501 estimates, in a step 612, the COLOR of the considered pixel by computing a weighted average of the COLORs associated to said pixel in all the layers of the reCOLORed focal stack which have a greater index than the layer of the reCOLORed focal stack to which the considered pixel belongs. That is to say, the processor 501 considers the layers located behind the layer to which the considered pixel belongs.

The weights used by the processor 501 during the computation of the weighted averages in steps 611 and 612 are inversely proportional to the distance in the reCOLORed focal stack between the layer in which the COLOR to be associated to the pixel is computed and the layer wherein said pixel is in focus, i.e. the greater the absolute value of the difference between the indexes of the layers the smaller the weight.

Steps 607 to 612 are executed by the processor 501 for each pixel of each layer of the reCOLORed focal stack.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. An apparatus for modifying COLORs of a focal stack of a scene according to a COLOR palette comprising a processor configured to:
apply the COLOR palette to an all-in-focus image generated from said focal stack,
estimate the COLOR of a not-in-focus pixel in a layer of a reCOLORed focal stack generated from the obtained reCOLORed all-in-focus image of the scene depending on a COLOR and on a position in said reCOLORed focal stack of at least one pixel in focus in at least one layer of said reCOLORed focal stack.

2. The apparatus according to claim 1, wherein the processor is configured to store, during the generation of the all-in-focus image, a position in the focal stack of a layer wherein a pixel is in focus.

3. The apparatus according to claim 2, wherein the processor is configured to generate the reCOLORed focal stack by putting a pixel of the reCOLORed all-in-focus image back into the layer of the reCOLORed focal stack wherein said pixel is in focus.

4. The apparatus according to claim 1, wherein the processor is configured to propagate the COLOR of a pixel in focus in a layer of the reCOLORed focal stack to the other layers of the reCOLORed focal stack by computing a convolution of said pixel in focus with a kernel.

5. The apparatus according to claim 4, wherein, when a pixel is in focus in a layer of the reCOLORed focal stack, the processor is configured to associate the COLOR of said pixel in the reCOLORed all-in-focus to said pixel in focus in said layer of the reCOLORed focal stack.

6. The apparatus according to claim 4, wherein the processor is configured to estimate the COLOR of a pixel in a layer of said reCOLORed focal stack wherein said pixel is not in focus by computing a weighted average of the COLORs associated to said pixel in other layers located before said layer in the reCOLORed focal stack.

7. The apparatus according to claim 6, wherein the weights used in the computation of the weighted average are inversely proportional to a distance in the reCOLORed focal stack between the layer in which the COLOR to be associated to the pixel is computed and the layer wherein said pixel is in focus.

8. A method for modifying COLORs of a focal stack of a scene according to a COLOR palette comprising: applying the COLOR palette to an all-in-focus image generated from said focal stack, estimating the COLOR of a not-in-focus pixel in a layer of a reCOLORed focal stack generated from the obtained reCOLORed all-in-focus image of the scene depending on a COLOR and on a position in said reCOLORed focal stack of at least one pixel in focus in at least one layer of said reCOLORed focal stack.

9. The method according to claim 8 further comprising generating the reCOLORed focal stack by pulling a pixel of the reCOLORed all-in-focus image back into the layer of the reCOLORed focal stack wherein said pixel is in focus.

10. The method according to claim 8, further comprising propagating the COLOR of a pixel in focus in a layer of the reCOLORed focal stack to the other layers of the reCOLORed focal stack by computing a convolution of said pixel in focus with a kernel.

11. The method according to claim 10, further comprising estimating the COLOR of a pixel in a layer of said reCOLORed focal stack wherein said pixel is not in focus by computing a weighted average of the COLORs associated to said pixel in other layers located before said layer in the reCOLORed focal stack.

12. The method according to claim 8, wherein the weights used in the computation of the weighted average are inversely proportional to a distance in the reCOLORed focal stack between the layer in which the COLOR to be associated to the pixel is computed and the layer wherein said pixel is in focus.

13. Non-transitory storage medium carrying instructions of program code for executing the method modifying COLORs of a focal stack of a scene according to a COLOR palette according to claim 8, when said program is executed on a computing device.

\* \* \* \* \*

UNITED STATES PATENT AND TRADEMARK OFFICE
CERTIFICATE OF CORRECTION

| | | |
|---|---|---|
| PATENT NO. | : 9,948,909 B2 | Page 1 of 1 |
| APPLICATION NO. | : 15/199760 | |
| DATED | : April 17, 2018 | |
| INVENTOR(S) | : Vincent Demoulin et al. | |

It is certified that error appears in the above-identified patent and that said Letters Patent is hereby corrected as shown below:

In the Claims

At Column 11, Line 2, replace "pulling" with --putting--.

Signed and Sealed this
Twenty-seventh Day of December, 2022

*Katherine Kelly Vidal*

Katherine Kelly Vidal
*Director of the United States Patent and Trademark Office*